US012403462B1

(12) United States Patent
Gieseke

(10) Patent No.: US 12,403,462 B1
(45) Date of Patent: Sep. 2, 2025

(54) FLUID SAMPLER

(71) Applicant: The United States of America as represented by the Secretary of the Navy, Newport, RI (US)

(72) Inventor: Thomas J Gieseke, Dighton, MA (US)

(73) Assignee: The United States of America as represented by the Secretary of the Navy

( * ) Notice: Subject to any disclaimer, the term of this patent is extended or adjusted under 35 U.S.C. 154(b) by 295 days.

(21) Appl. No.: 18/233,371

(22) Filed: Aug. 14, 2023

(51) Int. Cl.
*B01L 3/00* (2006.01)
*B01L 3/02* (2006.01)

(52) U.S. Cl.
CPC ..... *B01L 3/0217* (2013.01); *B01L 2200/0689* (2013.01); *B01L 2300/042* (2013.01); *B01L 2300/0832* (2013.01)

(58) Field of Classification Search
CPC ........... B01L 3/0217; B01L 2200/0689; B01L 2300/042; B01L 2300/0832
See application file for complete search history.

(56) References Cited

U.S. PATENT DOCUMENTS 6,558,537 B1 * 5/2003 Herrington ............ B01D 65/08 210/323.1
2019/0277831 A1 * 9/2019 Johnson ........... A61B 5/150022

* cited by examiner

*Primary Examiner* — Jamel E Williams
(74) *Attorney, Agent, or Firm* — James M. Kasischke; Jeffry C. Severson

(57) ABSTRACT

An apparatus is provided for obtaining fluid samples with the apparatus having a tubular body with a top and a bottom. A spring operated plunger shaft extends axially from the top to the bottom of the tubular body. A sample volume cap is attached to an end of the spring operated plunger shaft. A plunger is attached to the spring operated plunger shaft. A fusible link is used to maintain the spring operated plunger shaft in a first position. Upon activation of the fusible link, axial motion of the spring operated plunger shaft draws fluid into the tubular body trapping the fluid between the plunger and the sample volume cap inside the tubular body.

20 Claims, 3 Drawing Sheets

FLUID SAMPLER

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

CROSS REFERENCE TO OTHER PATENT APPLICATIONS

None.

BACKGROUND OF THE INVENTION

1) Field of the Invention

The present invention is directed to a remotely operated fluid sampler.

2) Description of the Related Art

In oceanographic research and waterway management, there is a need to collect water samples. In many circumstances when the number of required samples is small or when access by an operator is convenient, manual collection methods, including pipettes, syringes, and small containers may be appropriate. Water sampling systems of these types are well known in the art and are commercially available. However, numerous circumstances exist where the water to be sampled is not easily accessible, such as in deep water and wells. Also, the timing for obtaining the sample is inconvenient, such as when periodic samples are collected over a long period of time in a remote area.

Water sampling devices of this type are not generally available and although examples of systems designed for these applications exist; the systems do not provide sufficient capabilities. One solution employed in the oceanographic research field uses evacuated bottles that are subsequently filled with water samples. The bottles are submerged, and when placed in the location where a sample is desired, the bottles are individually opened with a valve and water is drawn in through the valve.

Multiple bottles are clustered with individual valves to fill discrete bottles at desired sample timing. This solution can be modified to include pumps to force water into the chambers. Designs employing this approach include valve systems that are complex and costly. Furthermore, the bottles must withstand high pressures prior to filling if employed in environments at high ambient pressure such as deep water environments.

A device is needed that can be remotely deployed and subsequently activated to collect multiple samples of water (or other fluid) in which it has been placed, on a sampling schedule that may extend over a long period of time. The solution should be comparatively low cost, mechanically simple, suitable for employment at high ambient pressures, and suitable for remote or autonomous actuation.

SUMMARY OF THE INVENTION

The invention is a fluid sampling system that can be remotely deployed and activated to collect multiple samples of water (or other fluid) in which the system is placed. The system can be placed on an extendable or specified sampling schedule.

The system includes a remotely actuated water sampler with an integrated storage reservoir and seal. The water sampler is modular such that larger numbers can be integrated into a larger sampler system to collect multiple water samples on a specified schedule.

The sampler includes a body having a spring retention section, a sample volume section, and a sample strainer section. The bottom of the spring retention section is attached to the top of the sample volume section and the bottom of the sample volume section is connected to the top of the sample strainer section.

A plunger shaft having a first end and a second end is positioned in the body and extends axially from the top of the spring retention section, through the sample volume section, and to the bottom of the sample strainer section. A spring is disposed around the first end of the plunger shaft. A sample volume cap is attached to the second end of the plunger shaft with a plunger attached to the plunger shaft. The plunger is located between the sample volume section and the sample strainer section.

In another embodiment of the invention, a fluid sampler module has a tubular body with a top and a bottom. A spring operated plunger shaft extends axially from the top to the bottom of the tubular body. A sample volume cap is attached to an end of the spring operated plunger shaft with a plunger attached to the spring operated plunger shaft. Axial motion of the plunger shaft draws fluid into the tubular body with the result of trapping the fluid between the plunger and the sample volume cap.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
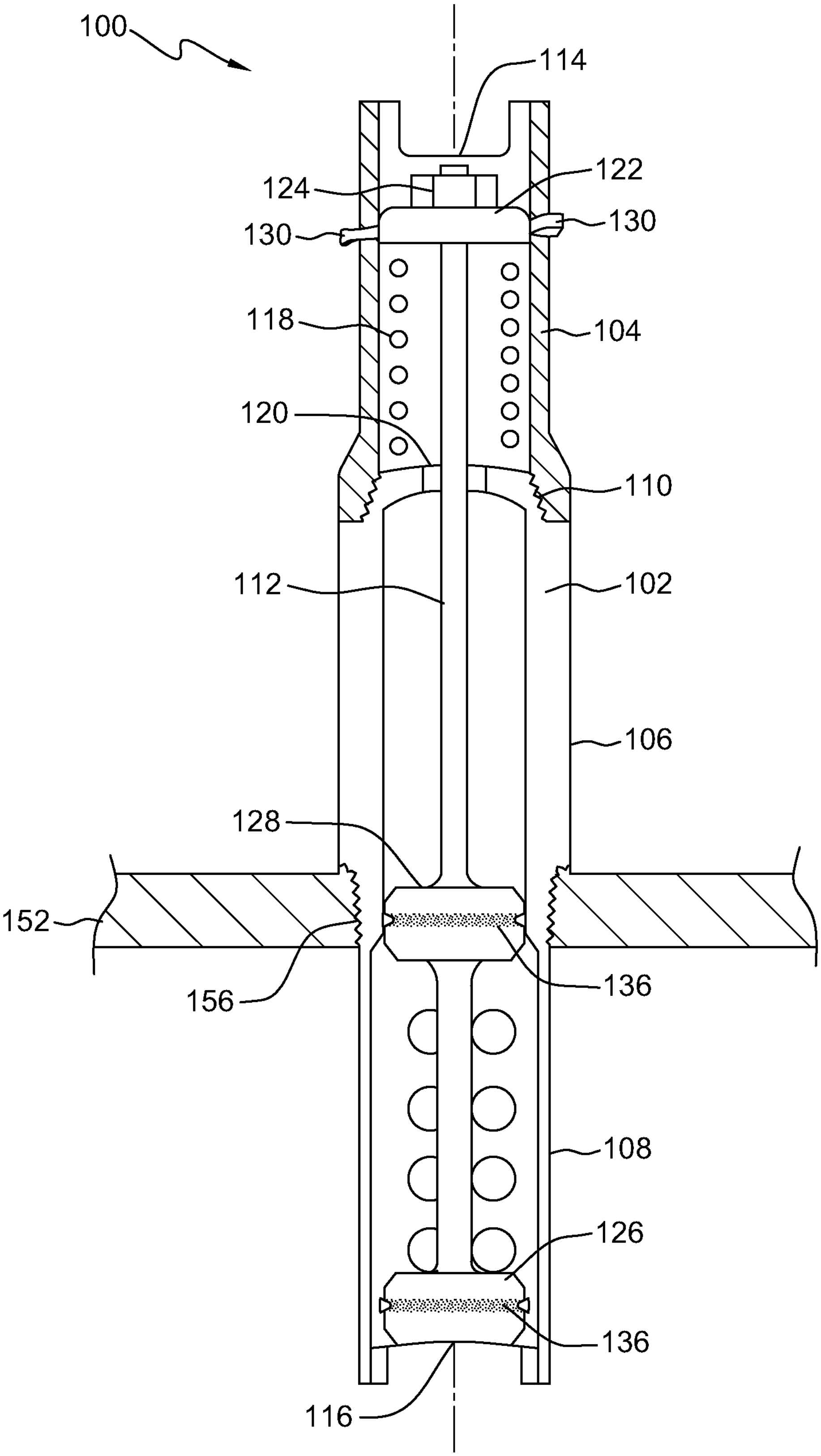
FIG. 1 is a cutaway view of a sampler module.

Referring to FIG. 1, a sampler module 100 includes a body 102. The body 102 includes a plurality of tube sections and a spring retention section 104, a sample volume section 106 and a sample strainer section 108. The bottom of the spring retention section 104 is attached to the top of the sample volume section 106. In some embodiments, the top of the sample volume section 106 includes threads 110 so that the spring retention section 104 can be threadedly engaged with the sample volume section.

The bottom of the sample volume section 106 is connected to the top of the sample strainer section 108. In some embodiments, the sample volume section 106 and the sample strainer section 108 can be formed together by additive manufacturing. The sample strainer section 108 is capable of allowing fluid to pass into and out of the strainer section.

A plunger shaft 112 having a first end 114 and a second end 116 is installed in the body 102 and extends axially from the top of the spring retention section 104, through the sample volume section 106, to the bottom of the sample strainer section 108. At the first end 114, a spring 118 is provided around the plunger shaft 112 and within the spring retention section 104. The top of the sample volume section 106 includes an aperture 120 for the plunger shaft 112 to pass therethrough. The spring 118 rests on the top of the sample volume section 106 and is held in place by a disk 122, which is attached to the plunger shaft 112 by a nut 124 or other appropriate fastener.

At the second end 116, a sample volume cap 126 is positioned on the plunger shaft 112, within the sample strainer section 108. A plunger 128 is provided on the plunger shaft 112 between the sample volume section 106 and the sample strainer section 108.

In a first axial position shown in FIG. 1, the spring 118 is compressed axially between the top of the sample volume section 106 and the bottom of the shaft push disk 122, holding the plunger shaft 112 in position with the sample volume cap 126 extended into the sample strainer section 108. In this first position, the plunger 128 is at the bottom of the sample volume section 106.

Figure 2:
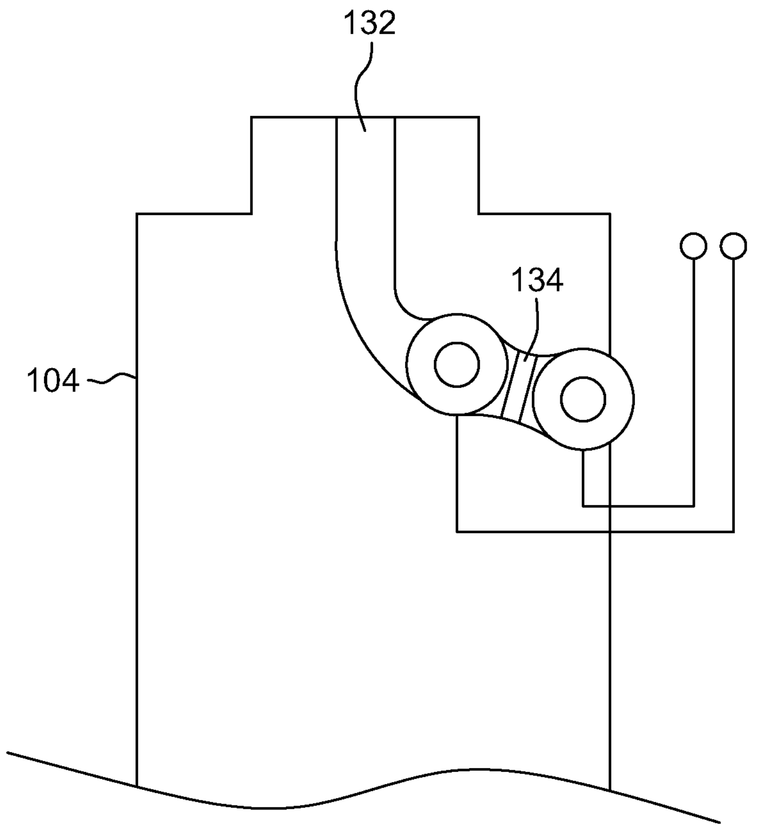
FIG. 2 is a side view of a fusible link on a sampler module.

The plunger shaft 112 is held in the first axial position by pins 130 that protrude from the periphery of the disk 122. Referring to FIG. 2, the pins 130 pass through a J-slot 132 located at the top of the spring retention section 104. A fusible link 134 holds the plunger shaft 112 and disk 122 in place by preventing motion of the pins 130 inside the J-slot 132. Tensile loads from the spring 118 are mitigated by sloping of the J-slot 132 where the pins 130 are received and the associated friction forces between the pins 130 and the J-slot.

In operation, the sample strainer section 108 extends into the fluid environment to be sampled. When a sample from the environment is desired, an electrical current is passed through the fusible link 134, causing it to burn and fail. When the fusible link 134 fails, the pins 130 are allowed to move in the J-slot 132. Force from the spring 118 against the disk 122 causes the disk to rotate with the pins 130 in the J-slot 132 until the pins are free and the disk can move axially. The spring then forces the disk 122, plunger shaft 112, and plunger 128 to a second axial position.

Axial motion of the plunger 128 draws fluid from the environment, through the sample strainer section 108 and into the sample volume section 106. The axial motion continues until the sample volume cap 126 reaches the bottom of the sample volume section 106. The sample volume cap 126 seals the bottom of the sample volume section 106 and the plunger 128 seals the top of the sample volume section 106.

In the second axial position, the spring 118 maintains a closing force on the plunger shaft 112. The desired fluid sample is trapped between the plunger 128 and the sample volume cap 126. Circumferential seals 136 are provided around the sample volume cap 126 and the plunger 128 to form a watertight seal between the plunger and an interior wall of the sample volume section 106 and between the sample volume cap and the sample volume section in order to prevent leakage from the sample volume. The fluid sample remains inside the sample volume section 106 until extracted. The sample volume cap 126 may be manufactured from elastomer to allow penetration by a syringe to extract fluid from the sample volume section 106.

Figure 3:
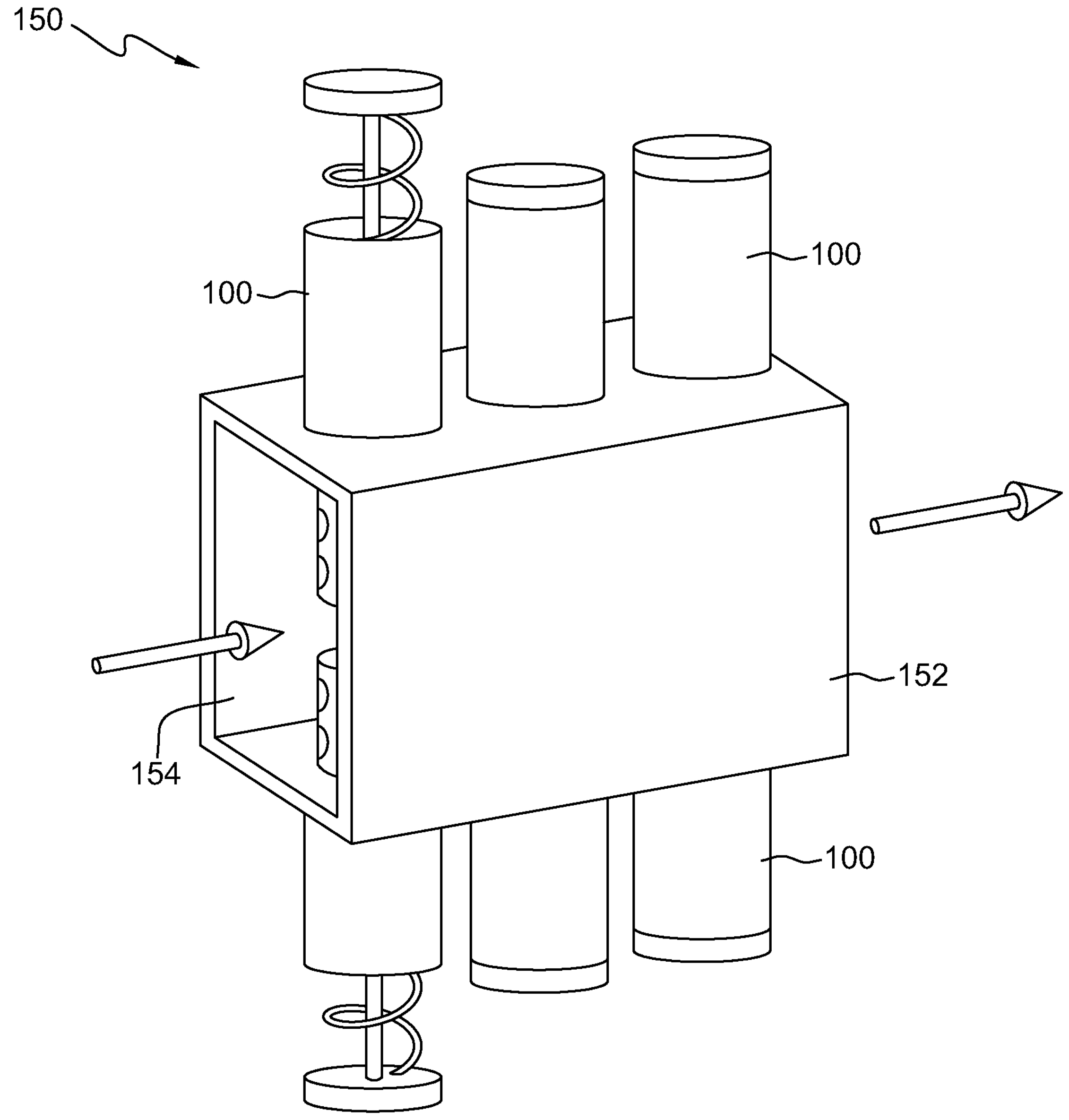
FIG. 3 is a perspective view of a fluid sampling system having a plurality of sampler modules.

FIG. 3 depicts a fluid sampling system 150. The fluid sampling system includes a housing 152 holding a plurality of sampler modules 100. The sample strainer section 108 of each of the sampler modules 100 extends into a central chamber 154 of the housing 152. Using this arrangement, fluid flow through the central channel 154 can be sampled at intervals as triggered by the fusible links 134 of each individual sampler module 100 to collect a multitude of samples, each in a sample storage chamber, at a sample schedule, as needed.

Referring again to FIG. 1, the housing 152 can include threads 156 so that the sampler modules 100 can threadedly engage with the housing 152.

The fluid sampling system 150 is pressure balanced such that the system can operate at any ambient pressure without compromise in performance or risk of failure. The fluid sampling system 150 and each sampler module 100 can be scaled to the size of the application; thereby, allowing for very large or small samples to be collected.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An apparatus for obtaining fluid samples comprising:

a body having a spring retention section, a sample volume section, and a sample strainer section, wherein the bottom of said spring retention section is attached to the top of said sample volume section and the bottom of said sample volume section is connected to the top of said sample strainer section;

a plunger shaft having a first end and a second end installed in said body and extending axially from the top of said spring retention section, through said sample volume section, to the bottom of said sample strainer section;

a spring disposed around the first end of said plunger shaft;

a sample volume cap attached to the second end of said plunger shaft; and a plunger attached to said plunger shaft with said plunger located between said sample volume section and said sample strainer section.

2. The apparatus of claim 1, wherein the top of said sample volume section is closed and includes an aperture for said plunger shaft to pass therethrough.

3. The apparatus of claim 2, further comprising a disk attached to said plunger shaft wherein said spring rests on the top of said sample volume section and is held in place by said disk.

4. The apparatus of claim 3, further comprising:

a J-slot located at the top of said spring retention section;

pins protruding from the periphery of said disk into said J-slot; and a fusible link for preventing motion of said pins inside said J-slot.

5. The apparatus of claim 4, wherein electrical current passed through said fusible link causes said fusible link to fail and allows said pins to move inside said J-slot;

wherein force from said spring against said disk moves said plunger shaft drawing fluid into said sample volume section, and wherein motion of said plunger shaft continues until said sample volume cap reaches the bottom of said sample volume section.

6. The apparatus of claim 1, wherein said sample volume cap is elastomer.

7. The apparatus of claim 1, further comprising circumferential seals around said sample volume cap and said plunger.

8. The apparatus of claim 7, wherein said circumferential seals are capable of forming a watertight seal between said plunger and an interior wall of the sample volume section and between said sample volume cap and said sample volume section.

9. A fluid sampler module comprising:

a tubular body having a top and a bottom;

a spring operated plunger shaft extending axially from a top to a bottom of said tubular body;

a sample volume cap attached to an end of said spring operated plunger shaft; and a plunger attached to said spring operated plunger shaft;

wherein axial motion of said spring operated plunger shaft draws fluid into said tubular body trapping the fluid between said plunger and said sample volume cap inside said tubular body.

10. The fluid sampler module of claim 9, wherein said sample volume cap is manufactured from elastomer.

11. The fluid sampler module of claim 9, wherein said tubular body comprises a spring retention section connected to the top of a sample volume section and a sample strainer section connected to the bottom of the sample volume section.

12. The fluid sampler module of claim 11, wherein the top of the sample volume section is closed and includes an aperture for said spring operated plunger shaft to pass therethrough; and wherein a spring rests on the top of the sample volume section and is held in place by a disk attached to said spring operated plunger shaft.

13. The fluid sampler module of claim 12, further comprising:

a J-slot located at the top of the spring retention section;

pins protruding from the periphery of the disk into said J-slot; and a fusible link for preventing motion of said pins inside said J-slot.

14. The fluid sampler module of claim 13, wherein electrical current passed through said fusible link causes said fusible link to fail and allows said pins to move inside said J-slot;

wherein force from said spring against said disk moves said spring operated plunger shaft drawing fluid into the sample volume section; and wherein motion of said spring operated plunger shaft continues until said sample volume cap reaches the bottom of the sample volume section.

15. The fluid sampler module of claim 10, further comprising circumferential seals around said sample volume cap and said plunger; and wherein said circumferential seals form a watertight seal between said plunger and an interior wall of the sample volume section and between said sample volume cap and the sample volume section.

16. A fluid sampling system comprising:

a housing having a central chamber capable of receiving fluid flow; and a plurality of fluid samplers attached to said housing, each fluid sampler arranged to obtain a fluid sample from said central chamber;

wherein each fluid sampler of said plurality of fluid samplers comprises:

a body having a spring retention section connected to the top of a sample volume section and a sample strainer section connected to the bottom of the sample volume section, the sample strainer section being disposed in the central chamber;

a plunger shaft extending axially from the top of the spring retention section to the bottom of the sample strainer section;

a spring disposed around the plunger shaft in the spring retainer section;

a sample volume cap attached to an end of the plunger shaft in the sample strainer section; and a plunger attached to the plunger shaft between the sample volume section and the sample strainer section.

17. The fluid sampling system of claim 16, wherein the top of said sample volume section is closed and includes an aperture for the plunger shaft to pass therethrough.

18. The fluid sampling system of claim 17, further comprising a disk attached to said plunger shaft wherein said spring rests on the top of the sample volume section and is held in place by said disk.

19. The fluid sampling system of claim 18, further comprising:

a J-slot located at the top of the spring retention section;

pins protruding from the periphery of the disk into said J-slot; and a fusible link preventing motion of said pins inside said J-slot.

20. The fluid sampling system of claim 19, wherein electrical current passed through said fusible link is capable of failing to break said fusible link and allowing said pins to move inside said J-slot;

wherein force from said spring against said disk moves said plunger shaft drawing fluid into the sample volume section; and wherein motion of the plunger shaft continues until said sample volume cap reaches the bottom of said sample volume section.

* * * * *